April 28, 1942.  B. GASPAR  2,281,281
PROCESS FOR PRODUCING COLOR PHOTOGRAPHS
Filed July 12, 1939
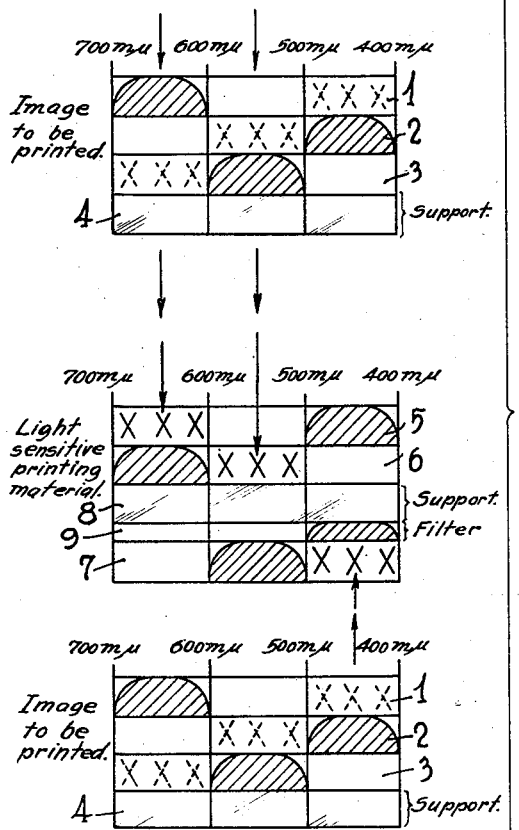
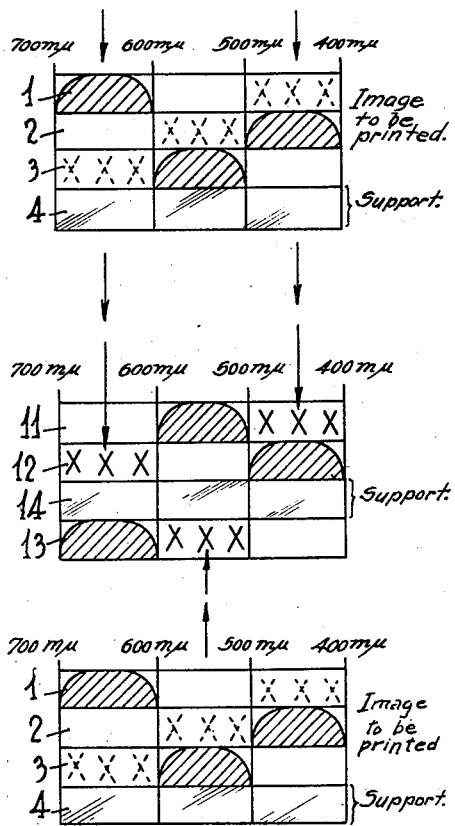
Explanation:
▨ — absorption range of dye stuff.
X X X — sensitive range.
↓ — printing light.
Inventor
Bela Gaspar,
By F. Gerald Frye
Attorney

UNITED STATES PATENT OFFICE 2,281,281

PROCESS FOR PRODUCING COLOR PHOTOGRAPHS

Bela Gaspar, Hollywood, Calif., assignor to Chromogen, Incorporated, a corporation of Nevada Application July 12, 1939, Serial No. 284,105
In Germany August 5, 1938

4 Claims. (Cl. 95—2)

The present invention relates to a process for the production of color photographic images, especially three-color images, with the use of a three-layer taking material and a printing material containing three image layers, which may contain the three dyes necessary for the formation of the images, i. e. those of blue-green, magenta and yellow color, before the exposure.

It is known that for the taking of a multi-color image there can be used multi-layer materials with pre-dyed layers only under certain conditions, namely when each of the layers contains a dye that permits the passage of the light of the component color which is to be recorded in the layer and moreover the light of the component colors to be recorded in the layers lying behind. If it is desired to record in the taking material the blue component color part-image in the front layer, it follows that this layer must be transparent for the blue light rays and furthermore it must allow the green and red light rays to pass through into the following layers. Accordingly, taking materials have already been described by the inventor, in which the front layer is colorless during the exposure and is subsequently dyed, while the second layer contains a yellow dye acting as a filter and serving for the subsequent formation of the image.

In order to print the images, taken on this known material and converted into colored images, directly on to a pre-dyed multi-layer material without the necessity of employing intermediate prints of the component color part-images to be recorded therein, it has heretofore been necessary to leave also the front layer of this printing material colorless and to dye it after the exposure. In order to avoid the special treatment of the top layer necessary with such a material, it has been suggested in a co-pending patent application of Paul Goldfinger, S. N. 284,103 filed July 12, 1939, and assigned to the present inventor that a printing material may be used, all of the layers of which are already dyed during the manufacture. In this material the blue-sensitive layer is arranged behind the layer facing the source of light used for printing, and the layer facing the source of light is sensitized for light outside the blue spectral range and consists of an emulsion whose blue sensitivity is only a small fraction of the sensitivity of the blue-sensitive emulsion lying behind it. The lowest layer of this material i. e., the one farthest away from the source of light is sensitive to red light and contains the yellow dye.

Likewise in the case of the present process, the picture is recorded on a three-layer film of the kind described above. The red part-image is recorded in the layer farthest away from the lens during the taking and is formed by a magenta dye-image. For the production of this layer there is used a red-sensitive silver halide emulsion dyed with the dye Benzopurpurine 10B— Schultz Farbstofftabellen, Leipzig 1931, 7th edition, vol I, No. 489. The green part-image is recorded in the green-sensitive layer of the taking material lying in front of the magenta layer, and is reproduced in a yellow dye, such as Chrysophenine G—Schultz, ibid No. 726—which is already present in the layer during the exposure. The blue part-image is taken in the front layer of the taking material which contains no special dye or sensitizer, but on the other hand preferably a precipitating agent, such as diphenylguanidine for example, for the subsequent precipitation of an insoluble dye-salt, and the blue part-image is recorded as a blue-green dye-image. The formation of the blue-green dye-image is preferably carried out by dyeing the blue-sensitive front layer after the exposure and by treating the developed and fixed film in a solution which destroys the dye in all the layers in dependence on the silver at the image or non-image parts.

With the aid of the above-described taking material, a multi-color image deviating from the natural colors is obtained, and according to the invention color-correct images can be obtained from this multi-color image without the use of intermediate prints, if the blue part-image and one of the other component part-images is printed with the aid of the recorded multi-color image from the one side on to a three-layer printing material, and if the third component part-image is printed from the other side on to the same three-layer printing material. The latter contains the various dyes necessary for the final formation of the images in all the layers before the exposure, each of the layers containing a dye which absorbs mainly rays of one of the three spectral thirds—the red third, the green third and the blue third—and is very permeable for the light rays of both the remaining visible spectral thirds. Furthermore, each of the layers of the printing material is sensitized to light rays of that spectral third for which the dye is permeable and for which the layer of the taking material having the same color is non-sensitive. The middle layer is screened from the blue rays of the printing light by a yellow dye. If the yellow emulsion layer is that layer of the printing material which is exposed from one side alone, the middle layer, or a filter layer arranged between it and the third layer of the material, contains a yellow dye, which can easily be washed out, such as tartrazine. In the case where the yellow-dyed emulsion layer is arranged as the middle layer, the image dye alone is sufficient to exclude the blue light rays, but here, too, an additive yellow filter dye may be employed. This filter dye must be capable of being washed out or destroyed independent of the image dye and should not contribute to the formation of the yellow dye-image.

In the accompanying drawing Fig. 1 illustrates diagrammatically the application of my improved printing process to a particular three color, three layer photographic material containing an image which is to be printed into a particular three color, three layer printing material. Fig. 2 illustrates diagrammatically the application of my improved printing process to the printing of the same three color image into a different three color, three layer printing material.

Referring to these diagrammatic illustrations in Fig. 1, for example, the image to be printed is represented as a section of a multilayer, multicolor photographic material in which three different layers, 1, 2 and 3, are coated on a transparent support 4. The front layer 1 contains a blue-green dyestuff image of the blue separation part-image. The middle layer 2 contains a yellow dyestuff image of the green separation part-image and the rear layer 3 contains a magenta dyestuff image of the red separation part-image. The absorption of the dyestuffs forming these respective separation part-images is illustrated by obliquely shaded areas on a projected spectrum which begins at the left with the red rays and extends over the visible spectrum to include the blue rays at right. The original predominant sensitivity of each of the layers of the taking material from which the image to be printed was derived is also illustrated on the projected spectrum by dotted X's. The vertical lines which cut all of the layers show, as indicated by the legends, the wavelengths. For example, the legend 600 mu indicates approximately the line of separation between the red and green spectral zones and the legend 500 mu indicates approximately the separating line between the green and the blue spectral zones.

The printing material in Fig. 1 is represented in a similar manner, the obliquely shaded areas representing the absorption of the diffusely dyed layers and the X's representing the sensitivity. In this material the top layer 1 is dyed yellow and made sensitive to red light; below this lies a layer 2 dyed blue-green and sensitized to green light. The lowest layer 3 is dyed magenta and is sensitive to blue light. The support 4 is preferably arranged between the blue-green-dyed layer and the magenta-dyed layer; however, it may also be at the rear behind the magenta-dyed layer. With this arrangement of the layers it is necessary to arrange between the blue-green-dyed and magenta-dyed layers, a yellow filter, for example in the form of a thin intermediate layer 5 dyed with a yellow dye capable of being easily washed out or destroyed, in order to prevent the superimposed blue-green layer from being influenced (on account of its natural blue-sensitivity) during the printing of the green part-image into the blue-sensitive magenta layer. The yellow filter dye may also be present in the blue-green layer. In printing with this material, for example, either the blue part-image or the red part-image is first printed, and then the other of these two color separations is printed from the top side. On the other hand the green part-image is printed in from the rear side of the printing material. The printing of the individual layers may also be carried out in one step, by employing a device for splitting the rays as is known for the simultaneous printing of double-layer films. Another possibility is that the top yellow dyed and the middle blue-green dyed layers can be printed simultaneously with appropriately mixed light and then the magenta dyed layer can be printed from the rear side.

As shown in Fig. 1 the photographic material containing the multicolor image to be printed is first printed from above into the printing material. In this step the blue separation part-image in layer 1, which is represented in the form of a blue-green dyestuff, is recorded in the red sensitive layer 5 of the printing material. The red separation part-image in layer 3, which is represented in the form of a magenta dyestuff, is similarly recorded in the green sensitive layer 6 of the printing material. The same multicolor image to be printed is then printed from beneath the printing material to record in the blue sensitive layer 7 the green separation part-image which is represented in the form of a yellow dyestuff.

In the printing material shown in Fig. 2 the top layer 11 is dyed magenta and is blue-sensitive, the layer 12 lying below is dyed yellow and is red-sensitive and the lowest layer 13 is dyed blue-green and is green-sensitive. The support 14 is preferably arranged between the yellow dyed and the blue-green dyed layers or it may be arranged underneath the blue-green layer. As shown in Fig. 2 the photographic material containing the multicolor image to be printed is first printed from above into the printing material. In this step the blue separation part-image in layer 1, which is represented by a blue-green dyestuff, is recorded in the red sensitive layer 12 of the printing material. The green separation part-image in layer 2, which is represented in the form of a yellow dyestuff, is similarly recorded in the blue sensitive layer 11 of the printing material. As indicated in the preceding example, either the blue separation part-image or the green separation part-image may be printed first or they may be printed simultaneously by using appropriately mixed light. The same multicolor image to be printed is then printed from beneath to record in the green sensitive layer 13 of the printing material the red separation part-image, which is represented in the form of a magenta dyestuff. Also the alternative printing operation described in connection with the first example of the printing material can be employed in a similar manner.

For the dyeing of the new printing material at its production the following dyes are suitable, for example: for blue-green, Diamine Pure Blue FF (Schultz Farbstofftabellen, Leipzig 1931, 7th ed., vol. 1, No. 510), preferably in the form of the $\beta$-naphthoquinolinium salt and in such a quantity that the finished layer contains 0.6–0.8 gram per sq. m.; for yellow, Chrysophenine G (Schultz l. c., No. 726) in a quantity corresponding to about 0.8 gram per sq. m. in the finished layer; and for magenta, Chlorantine Red 8B (Schultz l. c., No. 525) in a quantity corresponding to about 1 gram per sq. m. in the finished layer, the two last ones being preferably in the form of their diphenylguanidine salts.

What is claimed is:

1. A process for producing three-color pictures which comprises exposing a silver halide multilayer exposure film to the colored object, said multilayer film having a blue-sensitive front layer, a green-sensitive middle layer and a yellow dye in said middle layer, a red-sensitive rear layer and a magenta dye therein, developing said multilayer film, producing a yellow record of the green color separation and a magenta record of the red color separation of the object by local dye destruction within the predyed layers, converting the silver image within the front layer into a blue-green record of the blue color separation, printing the blue-green record of the blue color separation and one of the other records carried by said multilayer film from the one side, and printing the third record carried by said multilayer film from the opposite side onto a three-layer printing material without separating said layers, said three-layer printing material being one which has three predyed light-sensitive layers in superposition on a single support and which comprises in each of said layers a dye chiefly absorbing one-third of the visible spectrum and adequately transmitting the other two-thirds and which is capable of being locally destroyed in the presence of metallic silver, each of said layers being sensitized for light of such third of the spectrum as is transmitted by the dye present in the colored layer and not recorded in the identically colored layer of the exposure film but being essentially insensitive for differently colored light, developing the film and converting the silver images into dye-images by local dye destruction.

2. A process for producing three-color pictures according to claim 1, which comprises printing the blue-green record of the blue color separation and one of the other records carried by said multilayer film simultaneously from the one side onto the three layer printing material.

3. A process for producing three-color pictures according to claim 1, which comprises printing the blue-green record of the blue color separation and one of the other records carried by said multilayer film from the one side of the three layer material with white light, and printing the third record carried by said multilayer film from the opposite side onto the three-layer material with white light.

4. A process for producing three-color pictures from a multilayer multicolor master image comprising three color separations of a colored object, the green color separation being in the form of a yellow record, the red color separation being in the form of a magenta record and the blue color separation being in the form of a blue-green record, which comprises printing the blue-green record of the blue color separation and one of the other records carried by said multilayer film from the one side, and printing the third record carried by said multilayer film from the opposite side onto a three-layer printing material without separating said layers, said three-layer printing material being one which has three predyed light-sensitive layers in superposition on a single support and which comprises in each of said layers a dye chiefly absorbing one-third of the visible spectrum and adequately transmitting the other two-thirds and which is capable of being locally destroyed in the presence of metallic silver, each of said layers being sensitized for light of such third of the spectrum as is transmitted by the dye present in the colored layer and not recorded in the identically colored layer of the exposure film but being essentially insensitive for differently colored light, developing the film and converting the silver images into dye images by local dye destruction.

BELA GASPAR.